(12) United States Patent
D'Amore

(10) Patent No.: US 7,057,538 B1
(45) Date of Patent: Jun. 6, 2006

(54) 1/N-RATE ENCODER CIRCUIT TOPOLOGY

(75) Inventor: Matthew M. D'Amore, Los Angeles, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 0 days.

(21) Appl. No.: 11/033,371

(22) Filed: Jan. 10, 2005

(51) Int. Cl.
*H03M 7/12* (2006.01)

(52) U.S. Cl. .................. 341/70; 341/158; 375/281
(58) Field of Classification Search ............... 341/70, 341/158; 370/535; 375/281; 398/188
See application file for complete search history.

(56) References Cited

U.S. PATENT DOCUMENTS

| | | | | | |
|---|---|---|---|---|---|
| 4,611,196 | A | * | 9/1986 | Fernandez | 341/158 |
| 5,222,103 | A | * | 6/1993 | Gross | 375/281 |
| 6,151,336 | A | * | 11/2000 | Cheng et al. | 370/535 |
| 6,826,371 | B1 | * | 11/2004 | Bauch et al. | 398/188 |

* cited by examiner

*Primary Examiner*—Jean Bruner Jeanglaude
(74) *Attorney, Agent, or Firm*—Carmen B. Patti & Assoc., LLC

(57) ABSTRACT

An encoder circuit and a related method for its operation, in which digital encoding, such as differential phase-shift keyed (DPSK) encoding, is performed as a parallel operation on N bits at a time. Each encoded bit is both output in parallel with the others of the N bits and is coupled as an input to encode the immediately next bit in the input data stream. The $N^{th}$ encoded bit is fed back to the first encoder stage for use in encoding the $(N+1)^{th}$ bit in the input stream. The encoder typically includes a serial-to-parallel converter at the encoder inputs, and a parallel-to-serial converter at the encoder outputs.

12 Claims, 2 Drawing Sheets

1/N-RATE ENCODER CIRCUIT TOPOLOGY

This invention was made with Government support under contract. The Government has certain rights in this invention.

BACKGROUND OF THE INVENTION

This invention relates generally to digital encoders and, more particularly, to digital encoders such as differential phase shift keyed (DPSK) encoders used in communication systems. DPSK is a class of modulation techniques that encode information as a carrier phase difference between successively transmitted data symbols. In encoding a stream of bits (having values 1 or 0), a conventional DPSK encoder modulates the phase of a radio-frequency or optical carrier in accordance with the binary values in the data stream. Typically, the carrier phase is modulated by switching it between two possible phases, 0° and 180°. Thus, the carrier phase is switched back and forth between two possible relative phases, or polarities. In binary phase shift keying (BPSK), the carrier phase is toggled back and forth in accordance with the binary values of successive bits in the data stream. BPSK has a well known drawback in that recovery of the carrier at a receiver is subject to a possible phase error of 180°. This drawback is overcome by the use of differential phase shift keying (DPSK). In DPSK encoding, the carrier phase is made a '1' only if the next data bit to be encoded has a polarity that is different from that of the previously transmitted bit. Thus, if a '1' bit has just been transmitted and another '0' bit appears in the data stream, this latest bit in the data stream will be transmitted as a '1.' But if a '1' bit has just been transmitted and another '1' appears next in the data stream, this latest bit will be transmitted as a '0.' DPSK is sometimes defined as a modulation technique in which the carrier phase is changed each time a '1' bit is transmitted and does not change phase each time a '0' bit is transmitted.

DPSK is best defined from the logical equation:

$Q_{n+1} = D_k \oplus Q_n$, where $n=0, 1, 2, 3 \ldots$ and $k=0, 1, 2, 3 \ldots$ and where Q is the encoded bit, D is the data bit and $\oplus$ represents the exclusive-OR function.

Therefore, as shown in FIG. 1, the DPSK encoding function is conveniently implemented using an exclusive-OR (XOR) gate 10 and a flip-flop 12 to store the output of the gate and provide an output of the encoded bit Q. The Q output is fed back as a second input to the XOR gate 10, to compute the next Q output in accordance with the above equation. The output stream of encoded bits emerges from the encoder at the same bit rate that the data stream is clocked into the encoder. Unfortunately, in spite of its simplicity, this conventional DPSK encoder is often a "bottleneck" component that limits the rate at which a data stream can modulate a carrier using the DPSK modulation scheme. Time delays inherent in operation of the XOR gate 10 and the flip-flop 12 determine an upper limit to the rate at which the data stream may be encoded. Since encoding in accordance with the well known equation above is the very essence of DPSK encoding, there has always seemed to be no way to avoid using the conventional DPSK encoding structure of FIG. 1.

It will be appreciated from the foregoing that there has long been a need for an encoding circuit that avoids the potential bottleneck presented by the conventional DPSK encoder structure. The present invention satisfies this need, and provides a solution that has application to other coding schemes as well.

SUMMARY OF THE INVENTION

The present invention resides in a digital encoder that accepts a digital input stream in a parallel format and generates an encoded output stream also in a parallel format. Briefly, and in general terms, the invention may be defined as a reduced-rate differential phase shift keyed (DPSK) encoder, comprising a set of N encoder stages, wherein each stage comprises an exclusive-OR gate having a first input terminal for receiving, as an input, one of N parallel data bits, and a second input terminal, for receiving as an input, an output signal from an encoder stage responsible for encoding an immediately prior data bit. Each encoder stage further includes a bit storage device into which the output of the exclusive-OR gate is coupled upon the occurrence of a clocking signal applied to the bit storage device. Output from the $N^{th}$-stage bit storage device is fed back as an input to the first-stage exclusive-OR gate, to be used in the encoding of the $(N+1)^{th}$, $(2N+1)^{th}$ and subsequent data bits that are input to the first-stage exclusive-OR gate in second and subsequent cycles of parallel encoding operations.

In one disclosed embodiment of the invention, N=2, the DPSK encoder operates as a half-rate encoder. The 1/N-rate encoder may further comprise a serial-to-parallel converter, for converting a serial data stream to N-bit blocks of input data for coupling to the N encoder stages, and a parallel-to-serial converter, for converting N-bit blocks of encoded output data into a serial encoded output data stream.

In method terms, the invention may be defined as a method for encoding data in accordance with a differential phase shift keyed (DPSK) encoding scheme, but at a reduced encoding rate. The method comprises the steps of inputting in parallel N data bits to a set of N respective encoder stages, wherein each stage comprises an exclusive-OR gate having a first input terminal for receiving one of the N parallel data bits, and a second input terminal; coupling into the second input terminal of each stage an output signal from an encoder stage responsible for encoding an immediately prior data bit; clocking the output of each encoder stage into a bit storage device included in the stage; and coupling the output from the $N^{th}$-stage bit storage device back as an input to the first-stage exclusive-OR gate, to be used in the encoding of the $(N+1)^{th}$, $(2N+1)^{th}$ and subsequent data bits that are input to the first-stage exclusive-OR gate in second and subsequent cycles of parallel encoding operations.

The steps of the method may be performed for any practical value of N. One disclosed embodiment uses N=2 and the method performs a half-rate encoding process. The method may further comprise the steps of converting a serial data input stream to N-bit blocks of parallel data, for input to N encoder stages, and converting N-bit blocks of parallel output data from the N encoder stages to a serial data stream.

More generally, the invention may be defined as a reduced-rate digital encoder operating in accordance with an encoding scheme wherein the binary value of each successive encoded bit depends in part on the binary value of the immediately preceding encoded bit. As thus defined, the reduced-rate digital encoder comprises a set of N encoder stages, wherein each stage comprises digital logic having a first input terminal for receiving, as an input, one of N parallel data bits, and a second input terminal, for receiving as an input, an output signal from an encoder stage responsible for encoding an immediately prior data bit. Each encoder stage further includes a bit storage device into which the output of the digital logic is coupled upon the occurrence of a clocking signal applied to the bit storage device. Output from the $N^{th}$-stage bit storage device is fed back as an input to the first-stage digital logic, to be used in the encoding of the $(N+1)^{th}$, $(2N+1)^{th}$ and subsequent data bits that are input to the first-stage digital logic in second and subsequent cycles of parallel encoding operations.

It will be appreciated from the foregoing that the present invention represents a significant advance in digital encoding, particularly DPSK encoding. The invention allows for encoding in parallel at a correspondingly reduced rate, which permits the encoding operation to be performed at a higher data rate than if a full-rate encoder were to be used. Other aspects and advantages of the invention will become apparent from the following more detailed description, taken in conjunction with the accompanying drawings.

DETAILED DESCRIPTION OF THE INVENTION

Figure 1:
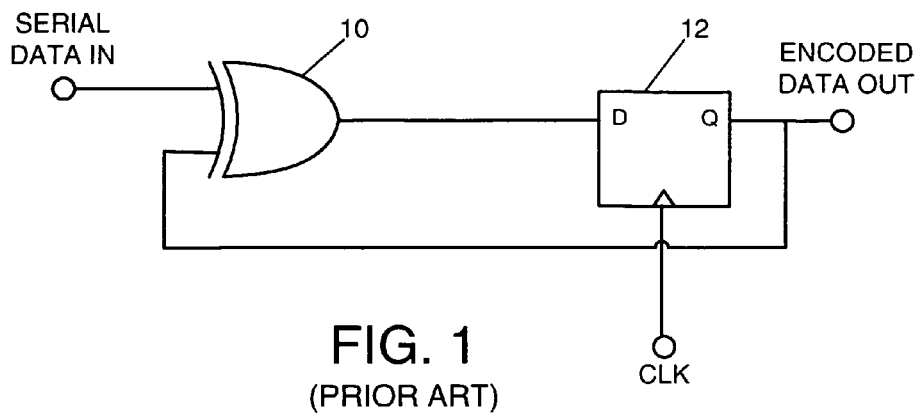
FIG. 1 is a block diagram showing a conventional full-rate serial encoder for differential phase shift keyed (DPSK) encoding.

As shown in the drawings for purposes of illustration, the present invention is concerned with digital encoders, and in particular with encoding schemes such as differential phase shift keying (DPSK). In DPSK encoding, the next binary value of an encoded bit stream is computed by logically combining the next (not yet encoded) data bit and the immediately preceding encoded bit. As described above with reference to FIG. 1, this process is conveniently performed by an exclusive-OR gate 10 and a flip-flop 12. The gate 10 and flip-flop 12 interpose a small but significant delay in the data stream and, in some applications, this delay limits the transmission data rate.

In accordance with the present invention, a digital encoder is configured to operate at a selected fraction of the full-rate encoder of FIG. 1 and, as will be seen from the discussion below, effectively raises the transmission data rate limit that would otherwise apply to a full-rate encoder. The principle of operation of a fractional-rate encoder is based on a simple expansion of the basic equation defining DPSK encoding:

$Q_{n+1} = D_k \oplus Q_n$, where $n = 0, 1, 2, 3 \ldots$ and $k = 0, 1, 2, 3 \ldots$ and where Q is the encoded bit, D is the data bit and $\oplus$ represents the exclusive-OR function.

The equation defining the next encoded bit is given by:

$Q_{n+2} = D_{k+1} \oplus Q_{n+1}$

The equation defining the next encoded bit is given by:

$Q_{n+3} = D_{k+2} \oplus Q_{n+2} = D_{k+2} \oplus (D_{k+1} \oplus Q_{n+1})$

Figure 2:
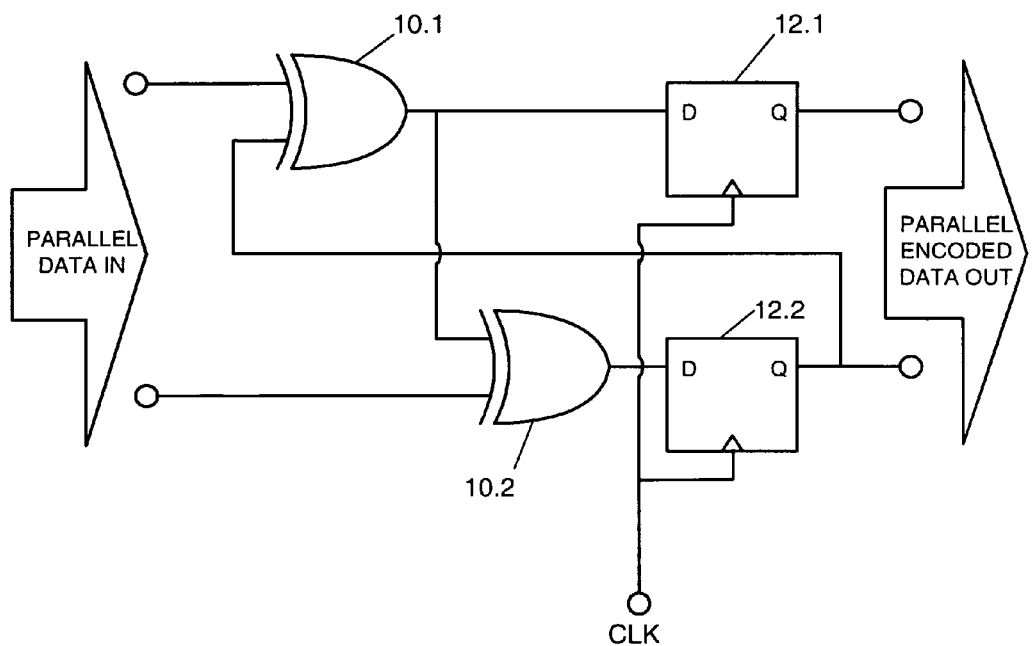
FIG. 2 is a block diagram depicting a half-rate encoder for DPSK encoding in accordance with the present invention.

From the above sequence, one can observe that a half-rate DPSK encoder can be constructed by using the previous $Q_{n+1}$ state and the next two data bits, $D_{k+1}$ and $D_{k+2}$, to calculate the next two encoded states, $Q_{n+2}$ and $Q_{n+3}$. FIG. 2 shows an implementation of the half-rate decoder, including first and second exclusive-OR gates 10.1 and 10.2, and first and second flip-flops 12.1 and 12.2. The output of the first exclusive-OR gate 10.1 is connected to the D input of the first flip-flop 12.1. The second exclusive-OR gate 10.2 receives one input from the output of the first gate 10.1 and a second input from a second of two parallel data input lines. The second exclusive-OR gate 10.2 has its output coupled to the D input of the second flip-flop 12.2. The first exclusive-OR gate 10.1 has a first input from a first of the two parallel data input lines and a second input fed back from the output of the second flip-flop 12.2.

In considering operation of the half-rate encoder of FIG. 2, suppose the first two data bits D1 and D2 are applied as inputs to the exclusive-OR gates 10.1 and 10.2, respectively. The other input of gate 10.1 is derived from the Q-output of flip-flop 12.2, which initially is an arbitrary value. The output from gate 10.1 is Q1 and this is input to the flip-flop 12.1 and simultaneously applied as an input to the second exclusive-OR gate 10.2. Thus, gate 10.2 logically combines the second input bit D2 and the first encoded output bit Q1, providing an output Q2 to flip-flop 12.2. In the next successive clock cycle, this Q2 output from flip-flop 12.2 is fed back as an input to gate 10.1, which now also receives the third input bit D3 as an input. In this clock cycle, gate 10.2 generates encoded output Q3, which is input to flip-flop 12.1 and simultaneously fed forward as an input to gate 10.2. The latter gate also receives as an input the fourth data bit D4 and generates encoded output bit Q4.

Figure 3:
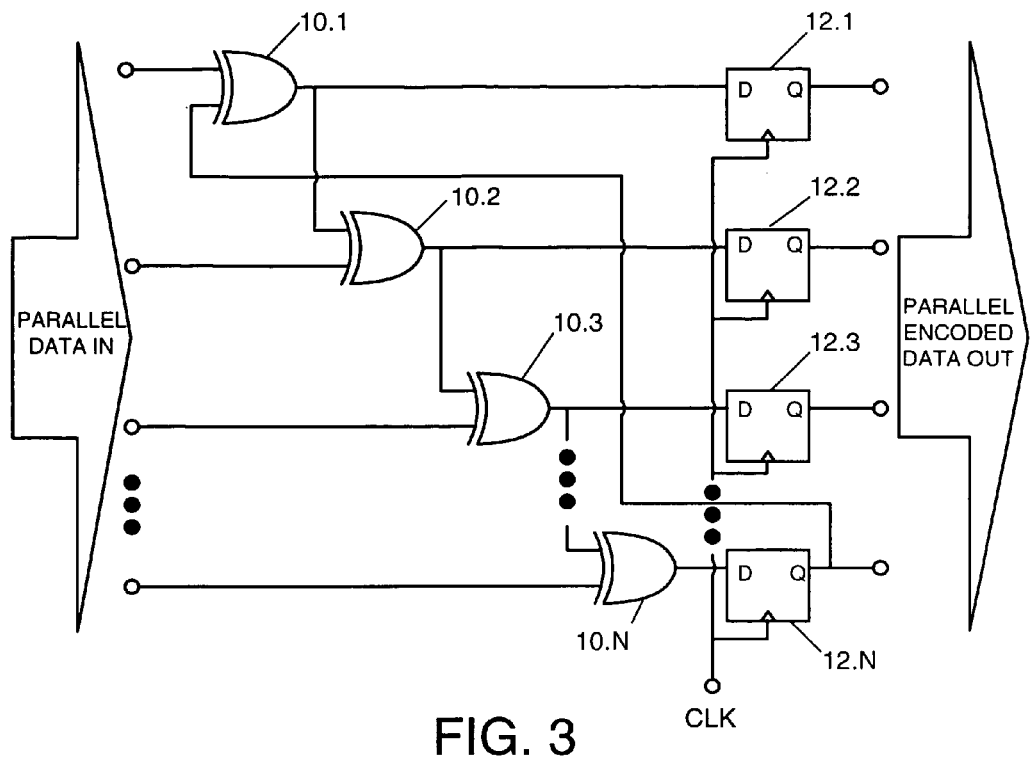
FIG. 3 is a block diagram depicting a 1/N-rate encoder for DPSK encoding in accordance with the present invention.

Accordingly, the FIG. 2 encoder, encodes data bits two at a time in parallel. In each clock cycle, the encoded output from the first exclusive-OR gate 10.1 is passed to the second gate 10.2 and the encoded output from the second exclusive-OR gate 10.2 is fed back to the first gate 10.1 for use in the processing the next pair of input bits. This principle may be extended to a 1/N-rate encoder, as depicted in FIG. 3. In this configuration, an input stream is converted to N-bit parallel form and is applied to N exclusive-OR gates, four of which are shown at 10.1, 10.2, 10.3 and 10.N. The outputs of the gates 10.1 through 10.(N−1) are coupled as inputs to the next succeeding gates, designated 10.2 through 10.N, respectively, and are also coupled as inputs to respective flip-flops 12.1 through 12.(N−1). The output of the last exclusive-OR gate 10.N is coupled to its corresponding flip-flop 12.N. The output of this flip-flop is fed back as an input to the first exclusive-OR gate 10.1, to be used in encoding the next successive group of N parallel input bits. As in the case of the half-rate encoder of FIG. 2, the 1/N-rate encoder of FIG. 3 requires data input in parallel form and produces parallel encoded output bits that must normally be converted to a serial stream for further processing and transmission.

Figure 4:
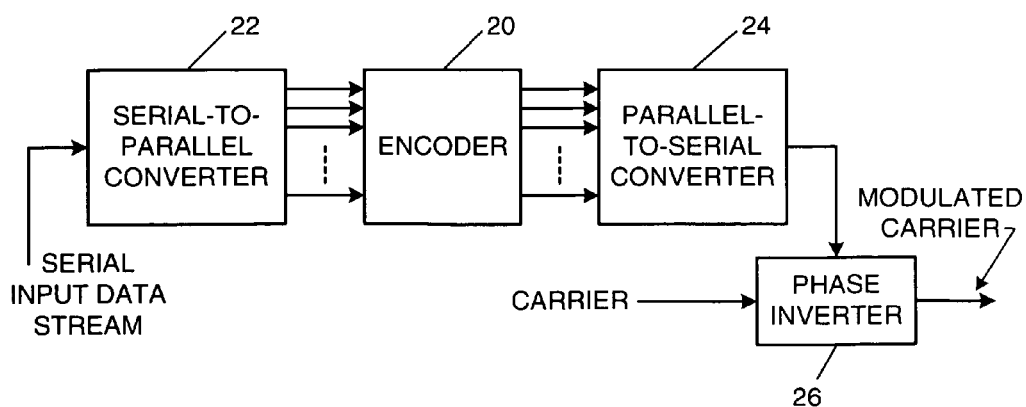
FIG. 4 is a block diagram depicting the encoder of FIG. 2 or FIG. 3 with additional components needed to process a serial data stream.

FIG. 4 shows a typical encoding configuration in accordance with the present invention, including an encoder 20, such as the one depicted in FIG. 2 or FIG. 3, a serial-to-parallel converter 22 to provide parallel inputs to the encoder, and a parallel-to-serial converter 24 to convert the parallel outputs back into serial form. The converters 22 and 24 may take any convenient and conventional form, such as a shift register (not shown) or some other form or multiplexer/demultiplexer. Typically, multiplexing operations can be performed more rapidly than the delays interposed by the encoder 20 and do not normally present a time limitation in the encoding process. Also shown in FIG. 4 is a phase inverter 26, which is controlled by the encoded data stream to produce a phase shift keyed carrier signal for transmission to a receiver (not shown).

To understand how the invention provides a timing advantage over a full-rate encoder (i.e., an encoder in which N=1), it is necessary to consider the various encoder time delays. In the full-rate encoder of FIG. 1, there are two significant time delays: a gate delay inherent in operation of the exclusive-OR gate 10, and a second delay inherent in operation of the flip-flop 12. When the bit rate, as determined by the rate of the clock signal applied to the flip-flop 12, is increased to the point where the sum of these two delays is equal to the clock period, then an upper frequency limit has been reached for operation of the encoder. In the 1/N-rate encoder of FIG. 3, the gate delay is N times the gate delay of the single gate in the full-rate encoder of FIG. 1. This is because the output of the $N^{th}$ gate 10.N cannot be determined until the output of each preceding gate 10 has been determined. The flip-flop delay in the encoder of FIG. 3 is, however, still the delay due to a single flip-flop, since all of the flip-flops operate in parallel. For a half-rate encoder (N=2), for example, the total delay due to the gates and flip-flops is significantly less than twice the delay of a fully rate encoder. More generally, the delay inherent in operation of a 1/N-rate encoder is less than N times the delay inherent in a full-rate encoder. In other words, the encoder delay increases less rapidly than the order N of the encoder. The higher the order N, the more this advantage is manifest, allowing higher clock speeds and higher data rates to be encoded and transmitted.

Although the invention is clearly applicable to DPSK encoding systems in particular, it may also have application to other types of encoding systems in which the value of each encoded bit depends in part on the immediately preceding value in the encoded bit stream. Accordingly, it will be appreciated that although a specific embodiment of the invention has been illustrated and described in detail, various modifications may be made without departing from the spirit and scope of the invention. Therefore, the invention should not be limited except as by the appended claims.

The invention claimed is:

1. A reduced-rate differential phase shift keyed (DPSK) encoder, comprising:
    a set of N encoder stages, wherein each stage comprises an exclusive-OR gate having a first input terminal for receiving, as an input, one of N parallel data bits, and a second input terminal, for receiving as an input, an output signal from an encoder stage responsible for encoding an immediately prior data bit;
    wherein each encoder stage further includes a bit storage device into which the output of the exclusive-OR gate is coupled upon the occurrence of a clocking signal applied to the bit storage device;
    and wherein output from the $N^{th}$-stage bit storage device is fed back as an input to a first-stage exclusive-OR gate, to be used in the encoding of a $(N+1)^{th}$, $(2N+1)^{th}$ and subsequent data bits that are input to the first-stage exclusive-OR gate in second and subsequent cycles of parallel encoding operations.

2. A reduced-rate DPSK encoder as defined in claim 1, wherein N=2 and the encoder operates as a half-rate encoder.

3. A reduced-rate DPSK encoder as defined in claim 1, and further comprising a serial-to-parallel converter, for converting a serial data stream to N-bit blocks of input data for coupling to the N encoder stages.

4. A reduced-rate DPSK encoder as defined in claim 3, and further comprising a parallel-to-serial converter, for converting N-bit blocks of encoded output data into a serial encoded output data stream.

5. A method for encoding data in accordance with a differential phase shift keyed (DPSK) encoding scheme, but at a reduced encoding rate, the method comprising:
    inputting in parallel N data bits to a set of N respective encoder stages, wherein each stage comprises an exclusive-OR gate having a first input terminal for receiving one of the N parallel data bits, and a second input terminal;
    coupling into the second input terminal of each stage an output signal from an encoder stage responsible for encoding an immediately prior data bit;
    clocking the output of each encoder stage into a bit storage device included in the stage; and
    coupling the output from the $N^{th}$-stage bit storage device back as an input to a first-stage exclusive-OR gate, to be used in the encoding of a $(N+1)^{th}$, $(2N+1)^{th}$ and subsequent data bits that are input to the first-stage exclusive-OR gate in second and subsequent cycles of parallel encoding operations.

6. A method as defined in claim 5, wherein N=2 and the method performs a half-rate encoding process.

7. A method as defined in claim 5, and further comprising:
    converting a serial data input stream to N-bit blocks of parallel data, for input to N encoder stages.

8. A method as defined in claim 7, and further comprising:
    converting N-bit blocks of parallel output data from the N encoder stages to a serial data stream.

9. A reduced-rate digital encoder operating in accordance with an encoding scheme wherein the binary value of each successive encoded bit depends in part on the binary value of the immediately preceding encoded bit, the reduced-rate digital encoder comprising:
    a set of N encoder stages, wherein each stage comprises digital logic having a first input terminal for receiving, as an input, one of N parallel data bits, and a second input terminal, for receiving as an input, an output signal from an encoder stage responsible for encoding an immediately prior data bit;
    wherein each encoder stage further includes a bit storage device into which the output of the digital logic is coupled upon the occurrence of a clocking signal applied to the bit storage device;
    and wherein output from the Nth-stage bit storage device is fed back as an input to a first-stage digital logic, to be used in the encoding of a $(N+1)^{th}$, $(2N+1)^{th}$ and subsequent data bits that are input to the first-stage digital logic in second and subsequent cycles of parallel encoding operations.

10. A reduced-rate digital encoder as defined in claim 9, wherein N=2 and the encoder operates as a half-rate encoder.

11. A reduced-rate digital encoder as defined in claim 9, and further comprising a serial-to-parallel converter, for converting a serial data stream to N-bit blocks of input data for coupling to the N encoder stages.

12. A reduced-rate digital encoder as defined in claim 11, and further comprising a parallel-to-serial converter, for converting N-bit blocks of encoded output data into a serial encoded output data stream.

* * * * *